April 11, 1950 H. L. COLLINS 2,503,323
AUTO VENTILATING DEVICE
Filed Oct. 7, 1946 2 Sheets-Sheet 1
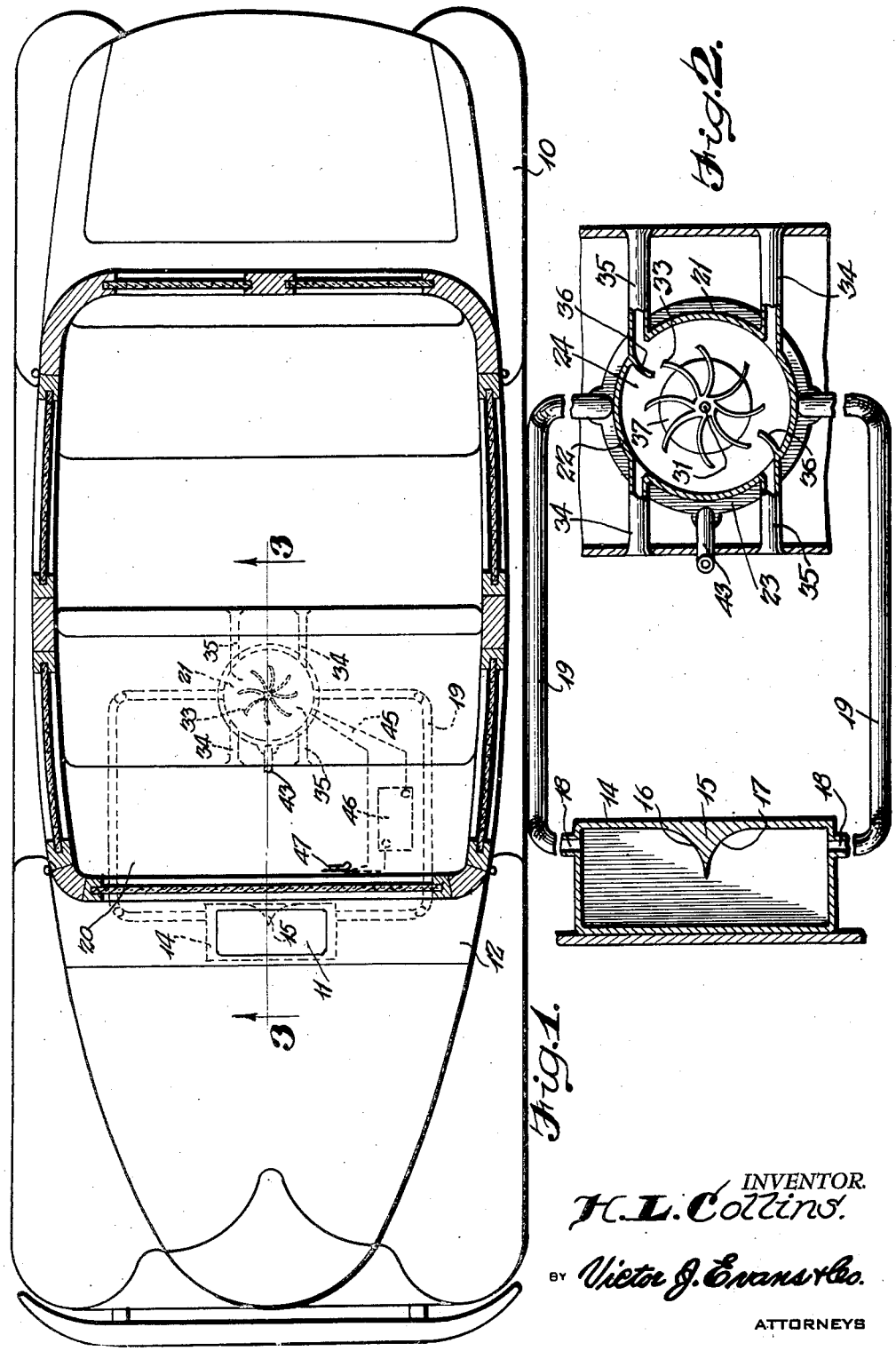
INVENTOR.
H. L. Collins.
BY Victor J. Evans & Co.
ATTORNEYS April 11, 1950 H. L. COLLINS 2,503,323
AUTO VENTILATING DEVICE
Filed Oct. 7, 1946 2 Sheets-Sheet 2
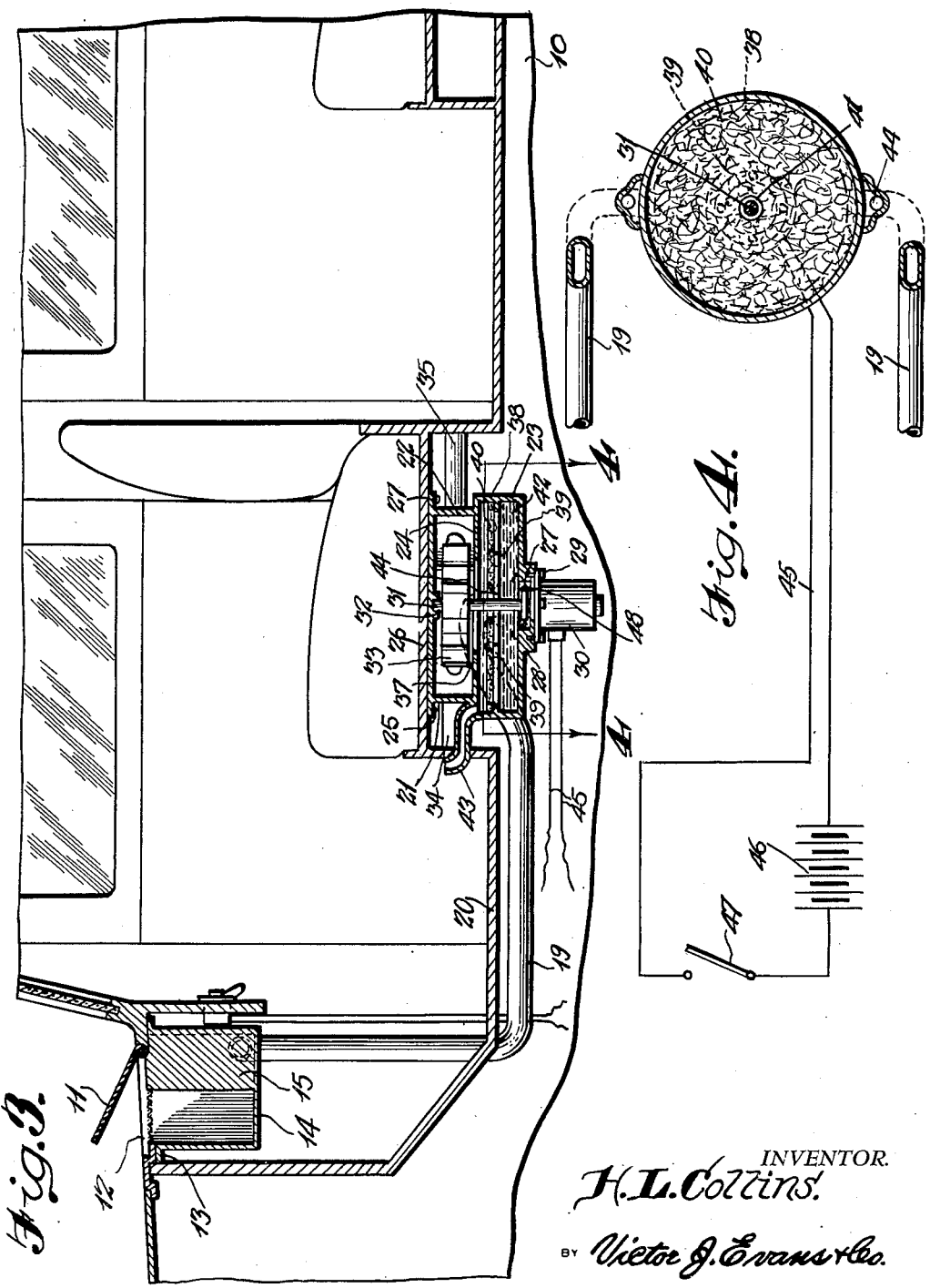
INVENTOR.
H. L. Collins.
BY Victor J. Evans & Co.
ATTORNEYS

UNITED STATES PATENT OFFICE 2,503,323

AUTO VENTILATING DEVICE

Henry L. Collins, Fort Worth, Tex.

Application October 7, 1946, Serial No. 701,646

1 Claim. (Cl. 98—2)

This invention relates to a ventilating device for motor vehicles having closed bodies.

An object of the invention is to provide a device which utilizes the incoming air to ventilate the vehicle, and forcing the air over a capillary action water means humidifies the air to cool the interior of the motor vehicle.

Another object of the invention is to provide a device that is simple in construction, durable in use, efficient in operation, and can be inexpensively manufactured for the purpose designed.

With the above and other objects in view, the invention consists of the novel details of construction, arrangement and combination of parts more fully hereinafter described, claimed and illustrated in the accompanying drawings in which:

Figure 1 is a sectional view of a motor vehicle, showing the embodiment of the invention in dotted lines as applied thereto;

Figure 2 is an elevational view, partly in section, of the device per se;

Figure 3 is a sectional view on the line 3—3 of Figure 1 and

Figure 4 is a sectional view on the line 4—4 of Figure 3.

Referring more in detail to the drawings, the reference numeral 10 designates a motor vehicle of the closed body type, which is provided with the usual cowl ventilating door 11 which is hingedly mounted on the exterior surface of the cowling 12 of the motor vehicle.

Secured to the cowling on the inner surface thereof, below the door 11, and in alinement therewith, is the annular flange 13 of the rectangular shaped box-like casing 14.

The casing 14 is provided with the baffle 15, having the oppositely concaved shaped faces 16 and 17 respectively. The baffle is formed integral with the rear wall of the casing 14 in vertical relation therewith.

Air entering through the door 11 is forced by the construction of the baffle 15 to be directed to the outlets 18 formed in the sides of the casing adjacent the bottom thereof, and air ducts 19 extend downwardly from both sides of the casing in vertical relation therewith to a position below the floor 20 of the vehicle. The ducts are then directed rearwardly below the floor in horizontal parallel relation to the floor, to be bent at right angles thereto to join with the housing 21 and thus connect the housing 21 with the casing 14.

The housing 21 comprises the circular portions 22 and 23 respectively, which are divided by the partition 24.

The portion 22 is provided at its upper marginal edge with an annular flange 25, whereby the housing 21 is secured to the undersurface of the seat support 26 by suitable fastenings 27.

The lower surface of the portion 23 is provided with an opening 27 which is surrounded by the circular flange 28, to which is secured by fasteners 29, the electric motor 30. The drive shaft 31 of the motor extends upwardly through the housing to be journalled at its upper end in the bearing 32 formed in the inner surface of the top wall of the portion 21.

The shaft 31 within the portion 22 is provided with a fan 33 which will drive the air entering the housing 21 through the air tubes 34 and 35 respectively.

Tubes 35, which extend both forwardly and rearwardly of the housing 21, are provided with curved deflector plates 36, which tend to scoop the air into the tubes, but tubes 34, which also extend forwardly and rearwardly of the housing 21, are not equipped with deflector plates.

Underlying the fan 33 is a central opening 37 in the partition 24, and it is through this opening that air from the portion 23 is forced into the portion 22.

Below the partition 24, the portion 23 is provided with a ring flange 38, which is formed integral with the cross braces 39, and the flange and braces support a disc pad 40 of absorbent material having the central apertures 41 to receive the shaft 31. The portion 23 below the disc 40 is filled with water 42 by means of the filler pipe 43 formed on the portion 23, and the motion of the vehicle which splashes water against the under surface of the disc, the disc pad is kept moist at all times.

The inlet ends 44 of the ducts 19 extend upward and downward as shown in dotted lines in Figure 3 and open into the lower portion 23 of the housing above the water level and below the disc pad 40, so that the air is forced through the pad to be humidified for the ventilating and cooling of the motor vehicle body.

The fan motor is provided with the electrical circuit wires 45 which, connected to the battery 46, has a switch 47 interposed therein for the control thereof, and packing 48 placed within the flange 28 provides a water tight seal at the drive shaft 31.

Air entering the motor vehicle cooling door 11 is therefore cooled for the pleasure of the occupant of the vehicle, and manipulation of the switch 47 engages the motor 30 for the operation of the device.

There has thus been provided, a device which it is believed will accomplish the objects of the invention, and it is believed that the operation and construction of the invention will be apparent to those skilled in the art.

It is also to be understood that changes in the minor details of construction, arrangement and combination of parts may be resorted to, provided they fall within the spirit of the invention, and the scope of the appended claim.

Having thus described the invention, what is claimed as new and desired to be secured by Letters Patent is:

In an air humidifier for a motor vehicle having a body with a seat therein and having an engine hood with a ventilator therein, the combination which comprises an air intake casing under the hood and positioned to receive air from the ventilator, a substantially flat horizontally disposed housing positioned under the seat of the body and having a water compartment in the lower part thereof, a horizontally disposed absorbent pad in the housing spaced above the water level of water in the said water compartment and positioned whereby motion of the vehicle splashes water against the under surface thereof, a pair of ducts connecting the air intake casing to the housing at points positioned between the said absorbent pads and water level of water in the compartment, a horizontally disposed fan positioned in the upper part of the housing above the said absorbent pad, a horizontally disposed partition having a central opening therein positioned between the absorbent pad and fan and providing a fan compartment in the upper end of the housing, outlet connections extended from the said fan compartment to points at the front and back of the seat, a vertically disposed centrally positioned fan shaft extended from the fan through the lower end of the housing and journaled in the housing, and a motor on the lower part of the housing and connected to the said fan shaft for driving the fan whereby air is drawn from the intake casing through the absorbent pad and discharged through the passages extended to the front and back of the seat.

HENRY L. COLLINS.

REFERENCES CITED

The following references are of record in the file of this patent:

UNITED STATES PATENTS

| Number | Name | Date |
| --- | --- | --- |
| 1,951,200 | Mullen et al. | Mar. 13, 1934 |
| 2,202,920 | Potter | June 4, 1940 |
| 2,238,585 | Findley | Apr. 15, 1941 |
| 2,262,384 | Cooper | Nov. 11, 1941 |
| 2,277,552 | Kneedler | Mar. 24, 1942 |
| 2,285,725 | Kneedler | June 9, 1942 |
| 2,342,901 | Schutt et al. | Feb. 29, 1944 |
| 2,360,617 | Onishi et al. | Oct. 17, 1944 |